(12) United States Patent
Sulser et al.

(10) Patent No.: US 8,894,097 B2
(45) Date of Patent: Nov. 25, 2014

(54) ADJUSTABLE STEERING COLUMN FOR A MOTOR VEHICLE

(75) Inventors: Hansjörg Sulser, Gamprin (CH); Rony Schnitzer, Ruggell (LI); Mathias Senn, Grabs (CH)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 13/807,103

(22) PCT Filed: May 31, 2011

(86) PCT No.: PCT/EP2011/002676
§ 371 (c)(1),
(2), (4) Date: Dec. 27, 2012

(87) PCT Pub. No.: WO2012/000593
PCT Pub. Date: Jan. 5, 2012

(65) Prior Publication Data
US 2013/0118292 A1    May 16, 2013

(30) Foreign Application Priority Data

Jun. 28, 2010 (DE) .......................... 10 2010 017 622
Aug. 6, 2010 (DE) .......................... 10 2010 036 891

(51) Int. Cl.
*B62D 1/19* (2006.01)
*B62D 1/184* (2006.01)
*B62D 1/185* (2006.01)

(52) U.S. Cl.
CPC ............... *B62D 1/185* (2013.01); *B62D 1/195* (2013.01); *B62D 1/184* (2013.01)
USPC .......................................... 280/777; 74/493

(58) Field of Classification Search
CPC .............. B62D 1/11; B62D 1/19; B62D 1/192
USPC ............................................. 280/777; 74/493
See application file for complete search history.

(56) References Cited

U.S. PATENT DOCUMENTS 4,793,204 A    12/1988  Kubasiak
4,900,178 A     2/1990  Haldric et al.
(Continued)

FOREIGN PATENT DOCUMENTS

DE    28 21 707    11/1978
DE    39 14 608    10/1990
(Continued)

OTHER PUBLICATIONS

International Search Report issued Dec. 15, 2011 in International (PCT) Application No. PCT/EP2011/002676.
(Continued)

*Primary Examiner* — James English
(74) *Attorney, Agent, or Firm* — Wenderoth, Lind & Ponack, LLP (57) ABSTRACT

An adjustable steering column for a motor vehicle has at least two components and at least one locking device. The components can be adjusted in the position thereof relative to each other along an adjustment path in an open position of the locking device and are locked in the position thereof relative to each other in a closed position of the locking device. A stop element is arranged at least a first of the components such that the stop element limits the adjustment path and can be detached from the first of the components when a force value is exceeded. The adjustable steering column has a tool which can be inserted between the stop element and the first of the components in order to detach the stop element.

20 Claims, 8 Drawing Sheets

(56) References Cited

U.S. PATENT DOCUMENTS

| | | |
|---|---|---|
| 5,029,489 A | 7/1991 | Burmeister et al. |
| 5,320,384 A | 6/1994 | Arnold et al. |
| 5,524,927 A | 6/1996 | Toussaint |
| 5,547,221 A | 8/1996 | Tomaru et al. |
| 5,580,091 A | 12/1996 | Doty |
| 5,606,892 A | 3/1997 | Hedderly |
| 6,095,012 A | 8/2000 | Lutz |
| 6,139,057 A | 10/2000 | Olgren et al. |
| 6,276,719 B1 | 8/2001 | Gärtner |
| 6,378,903 B1* | 4/2002 | Yabutsuka et al. ............ 280/777 |
| 6,394,241 B1 | 5/2002 | Desjardins et al. |
| 6,592,148 B2 | 7/2003 | Byers et al. |
| 7,422,239 B2* | 9/2008 | Ishibashi et al. ............. 280/777 |
| 7,685,903 B2 | 3/2010 | Streng et al. |
| 7,703,804 B2 | 4/2010 | Cymbal et al. |
| 7,721,620 B2 | 5/2010 | Matsui et al. |
| 7,866,699 B2 | 1/2011 | Levin et al. |
| 7,891,268 B2* | 2/2011 | Park ............................... 74/493 |
| 7,896,395 B2 | 3/2011 | Cymbal et al. |
| 8,408,089 B2 | 4/2013 | Oshita et al. |
| 2001/0019205 A1 | 9/2001 | Ikeda et al. |
| 2003/0000330 A1 | 1/2003 | Murakami et al. |
| 2004/0232685 A1 | 11/2004 | Gatti et al. |
| 2006/0090586 A1 | 5/2006 | Lee |
| 2006/0181070 A1 | 8/2006 | Imamura et al. |
| 2006/0243089 A1 | 11/2006 | Cymbal et al. |
| 2006/0290128 A1 | 12/2006 | Ridgway et al. |
| 2007/0137377 A1 | 6/2007 | Kamei |
| 2007/0252372 A1 | 11/2007 | Spano et al. |
| 2008/0191457 A1 | 8/2008 | Ridgway et al. |
| 2008/0229867 A1 | 9/2008 | Waibel et al. |
| 2008/0257097 A1* | 10/2008 | Graf ............................... 74/493 |
| 2008/0284150 A1* | 11/2008 | Yamada ...................... 280/777 |
| 2009/0013817 A1 | 1/2009 | Schnitzer et al. |
| 2009/0031843 A1 | 2/2009 | Marable et al. |
| 2009/0145258 A1 | 6/2009 | Davies et al. |
| 2010/0018340 A1 | 1/2010 | Schnitzer et al. |
| 2010/0031768 A1 | 2/2010 | Oshita et al. |
| 2010/0275721 A1 | 11/2010 | Davies et al. |
| 2010/0282016 A1* | 11/2010 | Oehri et al. ..................... 74/493 |
| 2010/0300236 A1 | 12/2010 | Goulay et al. |
| 2010/0300237 A1 | 12/2010 | Ridgway et al. |
| 2010/0300238 A1 | 12/2010 | Ridgway et al. |
| 2011/0041642 A1 | 2/2011 | Havlicek |
| 2011/0115206 A1* | 5/2011 | Sulser et al. ................. 280/775 |
| 2011/0174028 A1 | 7/2011 | Bahr et al. |
| 2011/0210537 A1 | 9/2011 | Uesaka |
| 2011/0271787 A1 | 11/2011 | Marable et al. |
| 2012/0024101 A1* | 2/2012 | Schnitzer et al. ............... 74/492 |
| 2012/0125139 A1 | 5/2012 | Tinnin et al. |
| 2012/0266716 A1* | 10/2012 | Sulser et al. .................... 74/493 |
| 2013/0074641 A1 | 3/2013 | Schnitzer et al. |
| 2013/0327176 A1 | 12/2013 | Domig et al. |

FOREIGN PATENT DOCUMENTS

| | | |
|---|---|---|
| DE | 10 2005 052 123 | 1/2007 |
| DE | 10 2007 002 091 | 7/2008 |
| DE | 10 2007 003 091 | 8/2008 |
| DE | 60 2004 012 021 | 3/2009 |
| DE | 10 2008 007 094 | 9/2009 |
| DE | 10 2008 007 093 | 11/2009 |
| DE | 10 2010 061 268 | 6/2012 |
| EP | 0 179 690 | 4/1986 |
| EP | 0 323 298 | 7/1989 |
| EP | 0 537 454 | 11/1995 |
| EP | 0 641 705 | 1/1997 |
| EP | 0 802 104 | 10/1997 |
| EP | 1 464 560 | 10/2004 |
| EP | 10 2004 051 060 | 1/2006 |
| EP | 1 125 820 | 3/2008 |
| EP | 1 955 921 | 8/2008 |
| EP | 1 975 036 | 10/2008 |
| EP | 2 022 699 | 2/2009 |
| FR | 2 781 748 | 2/2000 |
| FR | 2 840 869 | 12/2003 |
| FR | 2 881 707 | 8/2006 |
| GB | 1 584 984 | 2/1981 |
| GB | 2 288 154 | 10/1995 |
| GB | 2 291 840 | 2/1996 |
| GB | 2 311 839 | 10/1997 |
| GB | 2 454 345 | 5/2009 |
| JP | 62-161081 | 10/1987 |
| JP | 07-117685 | 5/1995 |
| JP | 9-2294 | 1/1997 |
| JP | 2004-67012 | 3/2004 |
| JP | 2006-096120 | 4/2006 |
| WO | 2008/071306 | 6/2008 |
| WO | 2008/083811 | 7/2008 |
| WO | 2008/142312 | 11/2008 |
| WO | 2009/147325 | 12/2009 |
| WO | 2010/000980 | 1/2010 |
| WO | WO 2010009486 A2 * | 1/2010 |

OTHER PUBLICATIONS

German Search Report dated Mar. 15, 2011 in German Application No. DE 10 2010 017 622.2.

German Search Report dated Mar. 18, 2011 in German Application No. DE 10 2010 036 891.1.

U.S. Office Action dated Apr. 11, 2014 issued in U.S Appl. No. 13/994,213.

* cited by examiner

ADJUSTABLE STEERING COLUMN FOR A MOTOR VEHICLE

BACKGROUND OF THE INVENTION

The present invention relates to an adjustable steering column for a motor vehicle, the steering column comprising at least two structural parts and at least one securement device. The structural parts, in an opened position of the securement device, are displaceable in their position relative to one another along a displacement path and, in a closed position of the securement device, are secured in position relative to one another. At least on a first of the structural parts, a stop element is disposed which delimits the displacement path and, upon a force value being exceeded, is detachable from the first of the structural parts.

Such adjustable steering columns are known within prior art. The displaceability of the two structural parts relative to one another serves, for example, for the purpose of enabling adapting the position of the steering wheel to a particular driver. Within prior art height and/or length-adjustable steering columns are known. If the structural parts of the steering column are to be displaced relative to one another, the securement device is moved into its opened position. When the desired setting or position relative to one another has been reached, the securement device is moved into the closed position in which the two structural parts of the adjustable steering column are secured in position relative to one another.

To exclude faulty operation and to delimit the displacement path in the opened securement device, it is known to provide on one of the two structural parts a stop element delimiting the displacement path. In order to abolish this delimitation in the event of a motor vehicle collision, thus in the event of a crash, it is known to implement this stop element such that it is detachable when a force value is exceeded. In prior art the term break-away elements is also frequently used.

A steering column of said type is disclosed, for example, in U.S. Pat. No. 7,703,804 B2. This publication discloses an adjustable steering column in which the displacement path is carried along a displacement region in the form of an elongated hole. In the event of a motor vehicle crash upon a predefinable force value being exceeded, a stop element is disengaged which, initially, had been secured on a steering column bearing unit, such that the steering column is displaceable along an expanded path which adjoins the displacement path. Such a solution is complex since the stop element must be suitably secured and the break-away force must be set. A further significant disadvantage comprises that a corresponding securement pin must be broken off which leads to a relatively high force peak at the beginning of the crash sequence. In the event of a crash this force peak can have a negative effect on the driver of the motor vehicle.

Another generic adjustable steering column is disclosed in DE 10 2007 002 091 A1. Here a stop element is also provided for delimiting the displacement path, which, when a predefined force value is exceeded, breaks off in the form of a break-away element and enables the path for a further axial dislocation of the steering spindle bearing unit relative to the chassis-stationary bracket unit. Here there is also the disadvantage that the break-away element, since it must withstand the occurring forces even in the case of faulty operation, at the beginning of the crash generates a relatively high force peak which is undesirable since it can lead to unnecessary injuries of the driver of the motor vehicle.

SUMMARY OF THE INVENTION

The invention addresses the problem of improving the generic adjustable steering column to the extent that the force peaks occurring during the detachment of the stop element are avoided or at least decreased.

This problem is resolved through an adjustable steering column according as described herein. The dependent claims describe features of preferred physical forms of the invention.

Consequently, there is provided that the adjustable steering column comprises a tool which for detaching the stop element at least regionally can be introduced between the stop element and the first of the structural parts. A fundamental concept is thus that the stop element no longer must, as is the case in prior art, be broken off via a blunt stop which leads to the undesired force peak, but rather this force peak is markedly reduced or avoided thereby that the tool is introduced, preferably slid in between the stop element and the first structural part, on which the stop element is initially secured. It can herein be provided that the tool during the introduction between the stop element and the first of the structural part pries and/or shears the stop element off the first of the structural parts. It is furthermore advantageous if on the tool and/or in the proximity of the stop element, onto which the tool impinges during the detachment of the stop element, a preferably wedge-shaped oblique face or oblique surface area or face or point is disposed. As is also the case in generic adjustable steering columns, it is herein provided that the stop element upon actuation below a preferably predefinable force value delimits the displacement path between the two structural parts and only upon reaching or exceeding the preferably predefinable force path, in particular in the event of a crash, a detachment of the stop element from the first of the structural parts takes place.

Preferred physical forms of the invention provide that the tool, at least during the detachment of the stop element from the first of the structural parts, is braced or supported, preferably is secured, on the other of the structural parts. The tool does not need to be herein absolutely supported directly on the other of the structural parts. It can also be provided that the tool is supported via a further structural part, for example an intermediate piece between the two structural parts, on the other structural part. It is generally feasible that the tool, relative to the other of the structural parts, is permanently nonmovably supported on the other of the structural parts, preferably is secured, thus fixed on the other of the structural parts. However, it is equally well feasible that the tool is supported only temporarily nonmovably, preferably secured, with respect to the other structural part on the latter. It can thus be provided that the tool relative to the other of the structural parts in only one engagement position of an engagement element is nonmovably supported, preferably secured, on the other of the structural parts, with the engagement element also comprising a detached position in which the tool is movable relative to the other of the structural parts.

The stop element advantageously comprises at least one stop face with which, upon reaching an end of the displacement path, it abuts on the other of the structural parts or a further structural part connected therewith.

On the stop face can be disposed at least one, preferably elastic, buffer or cushion for dampening the abutment. These cushions can be laid out in particular such that during an improper faulty operation at opened securement device, in which the two structural parts of the steering column are unusually forcefully moved relative to one another such that a vigorous abutment on the stop element occurs, they can cushion without a detachment of the stop element from the first of the structural parts occurring.

It is furthermore advantageous if the tool for detaching the stop element from the first of the structural parts does not act on the stop faces onto the stop element. This can be attained, for example, thereby that the tool for detaching the stop element from the first of the structural parts can be introduced in a region outside of the stop face between the stop element and the first of the structural parts.

The stop element can be a synthetic material part. It can be produced using an injection molding method. The synthetic material part can be comprised of a single material, but also of a combination of several materials. These can be produced, for example, in single- or multi-component injection molding. It is for example conceivable to implement the cushions of the stop element of another, in particular softer, material than the remaining stop element.

The stop element can be anchored by means of at least one peg on or in the first of the structural parts. The pegs can be fixedly disposed on the stop element and engage into corresponding openings in the first of the structural parts or conversely. It can also be provided for the peg or pegs to be formed integrally onto the stop element or the first of the structural parts, which, at least in the case of the stop element, can also be produced using single- or multi-component injection molding.

However, alternatively it is also conceivable and feasible to produce the stop element of metal, for example using an aluminum pressure die casting method. Due to the technology according to the invention, a high force peak at the beginning of the crash is nevertheless avoided herein.

Preferred physical forms of the invention provide that the tool is preferably a tab which is a part of an energy absorption device of the adjustable steering column, and the energy absorption device, at least in the event of a motor vehicle crash, connects at least the two structural parts of the steering for the absorption of energy. The energy absorption device and the securement device can herein be implemented such that they are integrated, however, they can also be implemented separately from one another. In its closed position, the securement device can, as is known per se, establish a connection under friction and/or under form closure between the two structural parts of the adjustable steering column.

Technically especially simply realizable physical forms of the invention provide that the stop element is disposed outwardly projecting on an outer surface of the first of the structural parts and the tool for detaching the stop element can be introduced between the stop element and the outer surface of the first of the structural parts. This comprises in particular also the case that the stop element is disposed entirely outside of an elongated hole.

Preferred physical forms of adjustable steering columns according to the invention provide that at least one of the structural parts is a bracket unit intended for the chassis-stationary fixing on the motor vehicle and the second of the structural parts is a steering spindle bearing unit held by the bracket unit for the rotatable bearing of a steering spindle. The steering spindle bearing unit in the opened position of the securement device is displaceable with respect to the bracket unit and, in the closed position of the securement device, is secured in its position relative to the bracket unit. Herein, the first of the structural parts on which the stop element is disposed can be the bracket unit and the other of the structural parts can be the steering spindle bearing unit. The converse implementation is also conceivable, in which the first of the structural parts is the steering spindle bearing unit and the other of the structural parts is the bracket unit.

The connection with the bracket unit can be established indirectly, for example via a clamp bolt known within prior art.

BRIEF DESCRIPTION OF THE DRAWINGS

Further features and details of preferred physical forms of the invention will be explained in conjunction with embodiments selected as examples and depicted in the Figures, in which.

DETAILED DESCRIPTION OF THE INVENTION

Like or identically acting elements are denoted in the Figures by the same reference numbers.

Figures 1, 7:
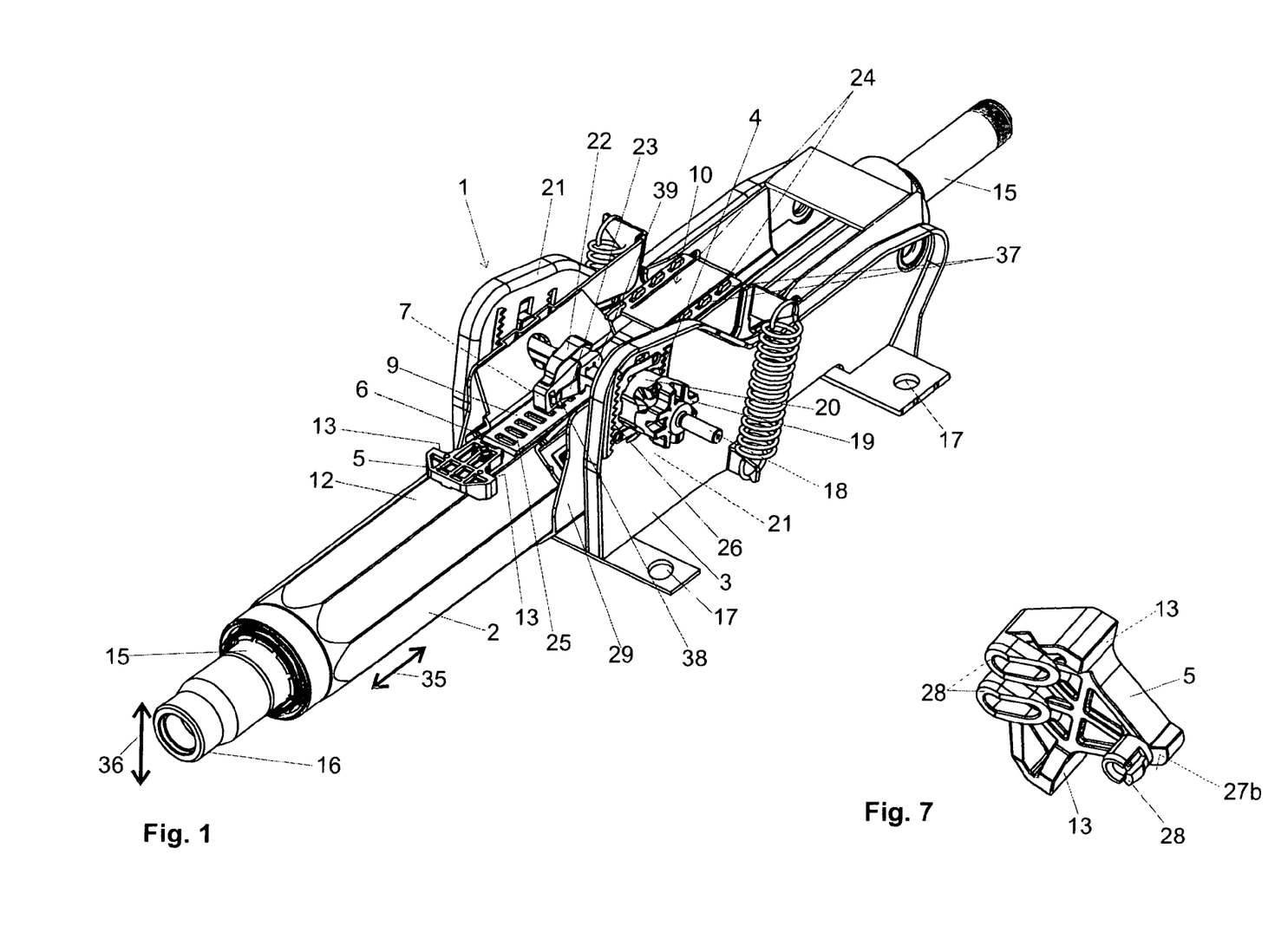
FIGS. 1 to 4 show a first embodiment of a steering column according to the invention.
FIGS. 5 to 7 show detailed depictions regarding the stop element and the first of the structural parts on which the stop element can be secured in position.

FIG. 1 shows a perspective depiction of a first embodiment of a steering column according to the invention. The first of the two structural parts 2 movable with respect to one another of the adjustable steering column 1 is implemented in this embodiment as a steering spindle bearing unit in which the steering spindle 15 is supported rotatably about its longitudinal axis. On the steering wheel connection 16 of the steering spindle 15 a steering wheel can be mounted. To secure the steering spindle 15 and first structural part 2 on the chassis of the motor vehicle another structural part 3 is provided, here in the form of a bracket unit. The bracket unit is fixed with the securement plates 17 on the chassis of the motor vehicle in a manner known per se. The bracket unit further comprises two side jaws 21 between which the steering spindle bearing unit is disposed. Between steering spindle bearing unit, or the first structural part 2, and bracket unit, or the other structural part 3, is located in the depicted embodiment, such as is known per se within prior art, additionally the further structural part 29 in the form of an intermediate piece. The depicted steering column 1 comprises a securement device 4. This includes, inter alia, as is known per se, the clamp bolt 18 as well as cam 19 and cam follower 20. Through rotation of the clamp bolt 18 about its longitudinal axis by means of a motor or swivel lever (neither shown here) cam 19 and cam follower 20 are turned against one another between an opened position of the securement device 4 and a closed position of the securement device 4. In the closed position of the securement device 4 the two side jaws 21 are pressed against the further structural part 29 and the steering spindle bearing unit (first structural part 2) such that the steering spindle bearing unit is fixedly held in its position relative to the bracket unit (structural part 3). The holding forces are of such magnitude that at least during normal operation, thus when no crash situation is occurring, the holding forces between the two structural parts 2 and 3 fix these in their position relative to one another. The securement device 4 can operate under form closure and/or under friction closure. In the depicted embodiment via the toothing 26, as is known per se, a form closure is attained with respect to the height displacement in the direction 36. With respect to the length displacement in the direction 35 the second structural part 2 is held under friction closure by the other structural part 3 if the securement device 4 is in the closed position. However, it is understood that all other physical forms known within prior art are also conceivable as alternatives.

The depicted steering column 1 is in any case height-adjustable in the opened position of the securement device 4 in the direction 36 as well as also length-adjustable in the direction 35. It is understood that there are also embodiments of the invention in which the steering column 1 is only height-adjustable or only length-adjustable.

Apart from the securement device 4, the depicted embodiment of the steering column 1 according to FIGS. 1 to 4 comprises additionally also an energy absorption device 10 which connects the two structural parts 2 and 3 with one another in the event of a motor vehicle crash for the purpose of absorption of energy. In the depicted embodiment this energy absorption device 10 comprises a tearing flex tab 9 which is fixedly connected with the steering spindle bearing unit or the first structural part 2 by means of the hook-eye connection 37. The tearing flex tab 9 comprises in the proximity of the hook-eye connection 37 the tear region 24 which, additionally to the pure bending of the tearing flex tab 9, ensures the desired energy absorption in the event of a crash. In order to be active in the event of a crash, the tearing flex tab 9 must be held securely or fixed on the bracket unit or the other structural part 3 at least in the event of a crash. In the concretely depicted first embodiment the hook-shaped engagement element 7 is provided for this purpose. This element comprises at least one tooth 38 with which, in the engagement position depicted in FIG. 1, it engages into one of the openings or cutouts 25 in the tearing flex tab 9. In the depicted embodiment, the hook-shaped engagement element 7 itself is bearing supported freely rotatably on the clamp bolt 18 of the securement device 4. A spring 22, of a spring element 39 also disposed on the clamp bolt 18, however presses the engagement element 7 depicted here continuously in the direction of the tearing flex tab 9 or entrainer arms 23. The entrainer arms 23 engage into an elongated hole in the engagement element 7 and are also part of the spring element 39 to which also the spring 22 belongs. The spring element 39 is supported under form closure on the clamp bolt 18 such that each rotational movement of the clamp bolt 18 about its longitudinal axis is transmitted onto the spring element 39. This serves for the purpose that the engagement element 7 in the opened position of the securement device 4, due to the engagement of the entrainer arms 23 into said elongated hole, can be brought with its tooth 38 out of contact with the tearing flex tab 9 or its cutout 25 in order for the two structural parts 2 and 3 to be shifted with respect to one another in the opened state of the securement device 4 without the tearing flex tab 9 being deformed in the process. When by turning of the clamp bolt 18 the securement device 4 is subsequently brought again into the closed position shown in FIG. 1, the spring element 39 is again swiveled simultaneously so far that the spring 22 presses the engagement element 7 again against the tearing flex tab 9. It may occur that the tooth 38 of the engagement element 7 engages directly into a cutout 25 on the tearing flex tab 9. However, it may also occur that the tooth 38 comes to lie on a web between two adjacent cutouts 25. In that case the engagement into one of the two cutouts 25 occurs only when the structural part 2 in the event of a crash is shifted relative to the structural part 3. As soon as in the event of a crash the engagement element 7 has come into engagement in the tearing flex tab 9 and the first structural part 2 is shifted further relative to the bracket unit or the other structural part 3, the engagement element 7 holds fixedly the tearing flex tab 9 on the other structural part 3 such that as a result the bending over or recurvature and tearing open of the tearing region 24 occurs wherewith the desired energy absorption proceeds. It should be noted here that, instead of a tearing flex tab, the energy absorption can also be effected through a pure bending, for example by means of a flex tab or through a pure separation operation.

In the depicted embodiment, the energy absorption device 10 is thus integrated into the securement device 4. This does not absolutely need to be the case. All other energy absorption mechanisms known within the prior art can also be applied in steering columns implemented according to the invention. These can be integrated into the securement device 4. However, they can also be implemented separately therefrom.

According to the invention in the steering column 1 discussed up to now, a stop element 5 is provided for delimiting the displacement path between structural part 2 and 3 and a tool 6, the tool 6 of the steering column 1 in the event of a crash being introduced between the stop element 5 and the first structural part 2, in order to detach the stop element 5 from the first structural part 2 under avoidance or at least marked reduction of force peaks. In the depicted variant according to the first embodiment the tool 6 is implemented as a portion of a tab, namely of the tearing flex tab 9. The tab, of which the tool 6 forms a portion, can alternatively be a flex tab 8 or a pure tearing tab. In the first embodiment the tool 6 specifically is the end of the tearing flex tab 9 oriented toward the steering wheel connection 16. In terms of avoidance of force peaks, it is advantageous if, as is the case in the depicted embodiment, the tool 6 is implemented as a wedge-shaped or, viewed with respect to the direction 35, oblique surface area or face 27a or point. In addition, or alternatively, a corresponding oblique face 27b can also be disposed in that region on the stop element 5 in which in the event of a crash the tool 6 impacts on the stop element 5. In the specifically depicted embodiment, as is provided in general in advantageous implementations, the stop element 5 is disposed outwardly projecting on an outer surface 12 of the first structural part 2 and the tool 6 for the detachment of the stop element 5 is introducible between the stop element 5 and the outer surface 12 of the first structural part 2. Through this introduction or sliding-in of the tool 6 between stop element 5 and first structural part 2, the stop element 5 is pried and/or sheared off from the first structural part 2 whereby the undesired force peaks during the detachment of the stop element 5 from structural part 2 are avoided or at least markedly reduced. It is to be preferred that the stop element 5 is pried off from the first structural part 2, especially preferred under avoidance of a shearing or breaking operation, for further lowering of the undesired force peaks during the detachment.

Figure 2:
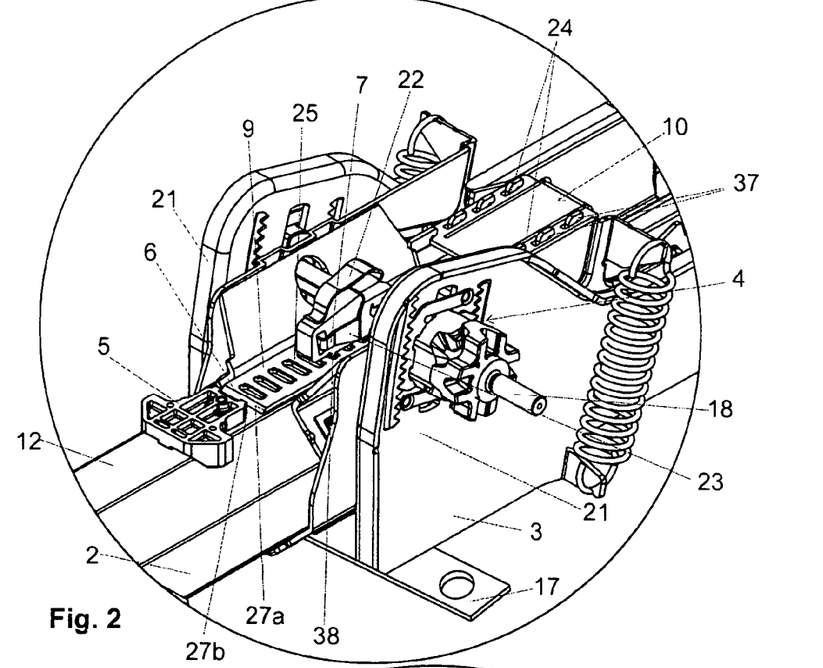
Figure 3:
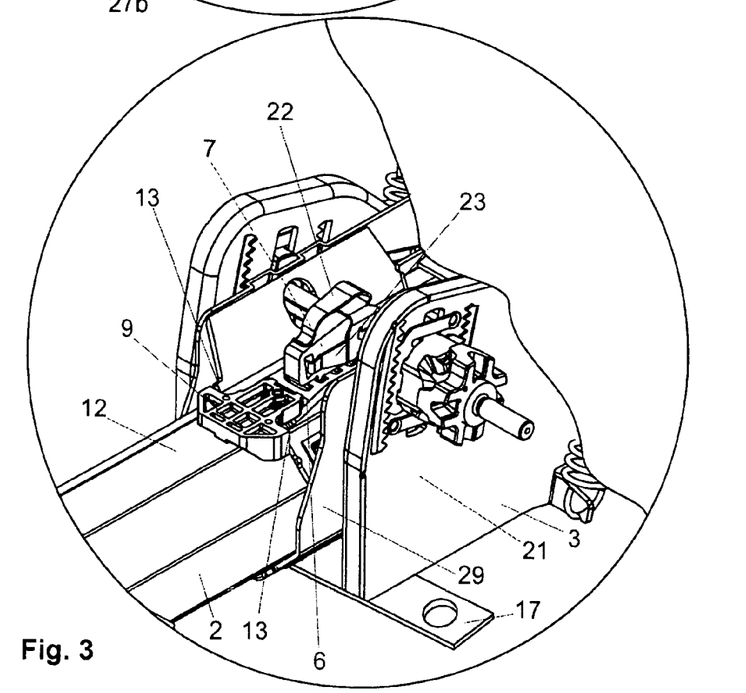
Figure 4:
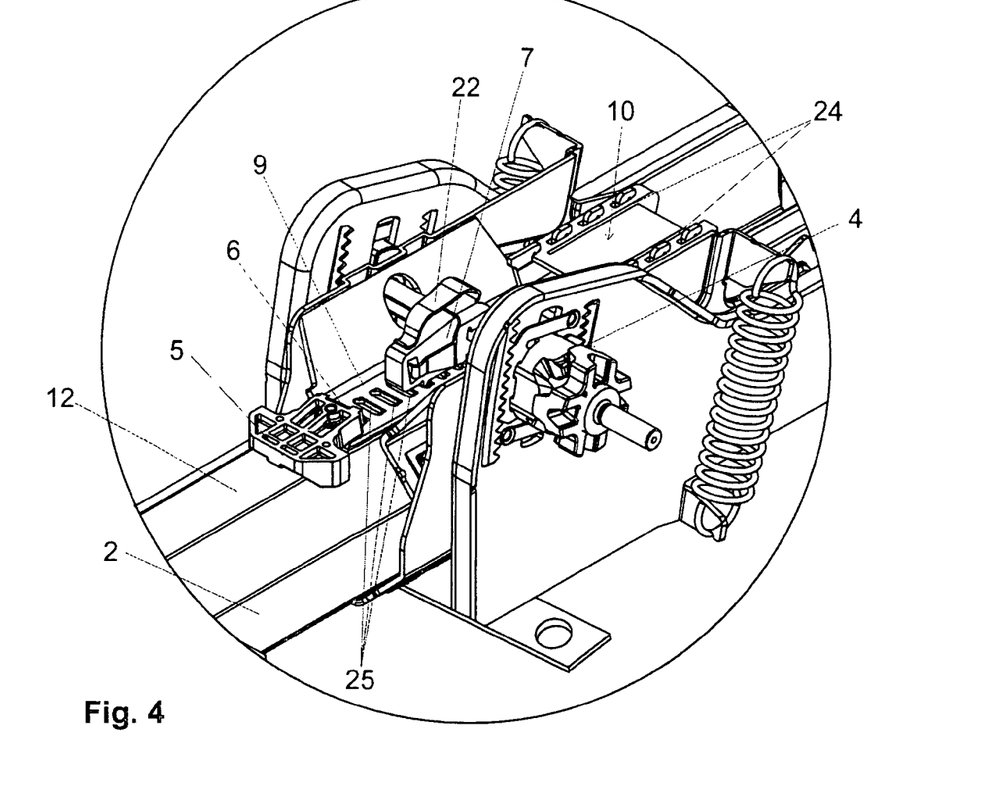

FIGS. 2 to 4 depict details in the proximity of securement device 4, stop element 5, tool 6 and energy absorption device 10 of the steering column depicted in FIG. 1. In FIG. 2 is shown by example a position during normal operation in which the motor vehicle is moved. The securement device 4 is in the closed position in which it holds fixedly in position the two structural parts 2 and 3 relative to one another. The engagement element 7 is in engagement position on the tearing flex tab 9, such that in the event of a motor vehicle crash the already described energy absorption can proceed. FIG. 3 shows a position during normal operation in which the end of the displacement path in the direction 35 has been reached, with only a small detail of the steering column being depicted. In this position the stop faces 13 are in contact on the further structural part 29 and therewith also indirectly on structural part 3 such that, even with the opened securement device 4 in which the engagement element 7 is also not in engagement with the tearing flex tab 9, the further sliding of the structural part 2 into the structural part 3 in the direction away from the steering wheel connection 16 is prevented. This is the normal function of the stop element 5 which is comprised of delimiting the displacement path between the two structural parts 2 and 3 in this direction. In this situation in which a motor vehicle crash has not yet occurred, the tool 6 is not slid in between stop element 5 and first structural part 2 such that the stop element 5 is fixedly secured on the second structural part 2. For the sake of completeness reference is made to the fact that in FIG. 3 the securement device 4 is depicted in the closed position even though the stop element 5 serves for delimiting the displacement path precisely when the securement device 4 is in the opened position. FIG. 4 now shows the case of a crash in which a collision of the motor vehicle has taken place or is taking place and the structural part 2 with the closed securement device 4, for the absorption of energy generated through the impact of the motor vehicle driver onto the steering wheel, is slid into the structural part 3. Before the occurrence of the crash, the situation was as depicted in FIG. 2.

In the case of a crash according to FIG. 4 the structural part 2, thus the steering spindle bearing unit, is slid into the structural part 3, thus the chassis-stationary bracket unit, in the direction away from the steering wheel connection 16 and in the direction toward the motor vehicle front. Via the engagement of the engagement element 7 into the tearing flex tab 9, this is held fixedly secured in position on the other structural part 3 such that the tearing flex tab 9 is bent over and the tearing region 24 is torn open wherein in the desired manner the energy introduced into the steering column 1 is dissipated. The tool 6 in the form of the front end of the tearing flex tab 9 is simultaneously introduced or slid between the stop element 5 and the outer surface 12 of the structural part 2, whereby, as indicated in FIG. 4, the stop element 5 is pried or sheared off from the structural part 2 without a disruptive force peak occurring. Through the removal of the stop element 5 from the structural part 2 a further dislocation of the structural part 2 is enabled with respect to structural part 3 with the simultaneous energy absorption by means of tearing flex tab 9 and friction between the friction faces. A force peak which in prior art is required during the breaking-off of the stop element 5 is here avoided in the manner according to the invention. Only in the case in which, during the detachment of the stop element 5, a shearing operation is executed by the tool 6 is a force peak generated. However, this force peak is markedly smaller than would be required for a breaking operation according to prior art. In spite of the low forces which are necessary for detaching the stop element 5 by means of tool 6, the stop element 5 can be robustly and fixedly implemented. The stop element 5 can be secured on structural part 2 such that it can also raise high resistance forces if the structural part 2 with opened securement device 4 is strongly jerked by the driver with the stop element 5 being disposed against the structural part 3 (i.e., the bracket unit).

Figure 5:
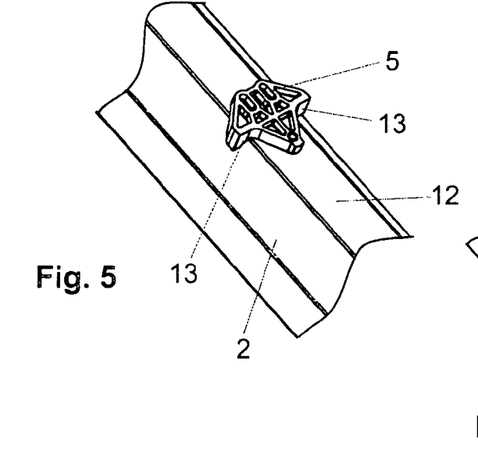
Figure 6:
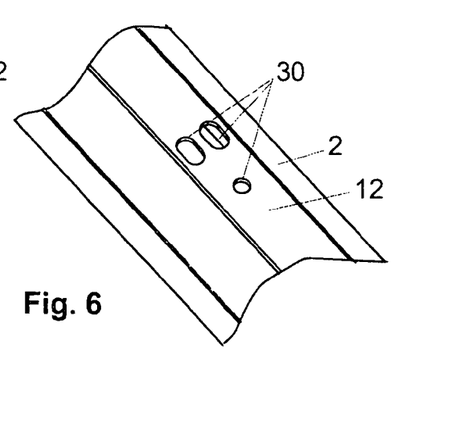

FIGS. 5 to 7 also depict details in relation to the first embodiment, wherein, as a matter of form, reference is made to the fact that the stop element 5 is implemented minimally differently than in FIGS. 1 to 4, which, however, does not change the general functional operation. In FIG. 5 the stop element 5 is secured on structural part 2 or its outer surface 12. In FIG. 6 the stop element 5 is demounted such that the openings 30 in structural part 2 can be seen into which, for securing the stop element 5 on structural part 2, the pegs 28 of the stop element 5 engage. The connections between pegs 28 and openings 30 can herein be connections acting under friction closure or other force-closure, such as snap-in connections. Alternatively, form-closure connections detachable correspondingly through prying off or shearing off are also conceivable. It is understood that alternatively the pegs can also be fixedly disposed on structural part 2 and engage into corresponding openings 30 on stop element 5.

Figure 8:
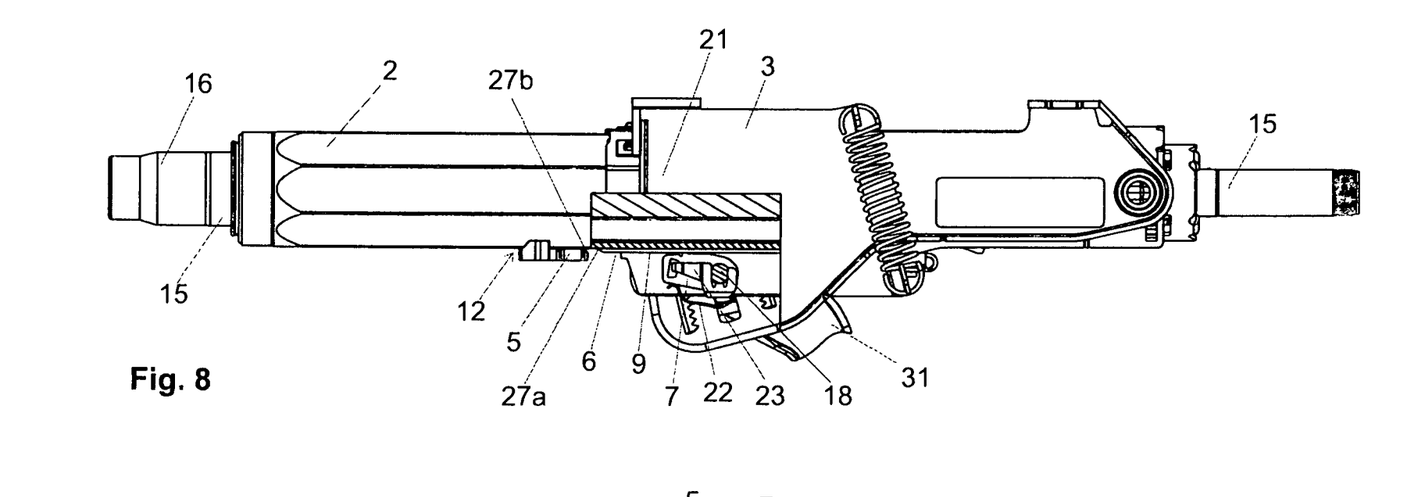
FIG. 8 is a side view of FIG. 2.
Figure 9:
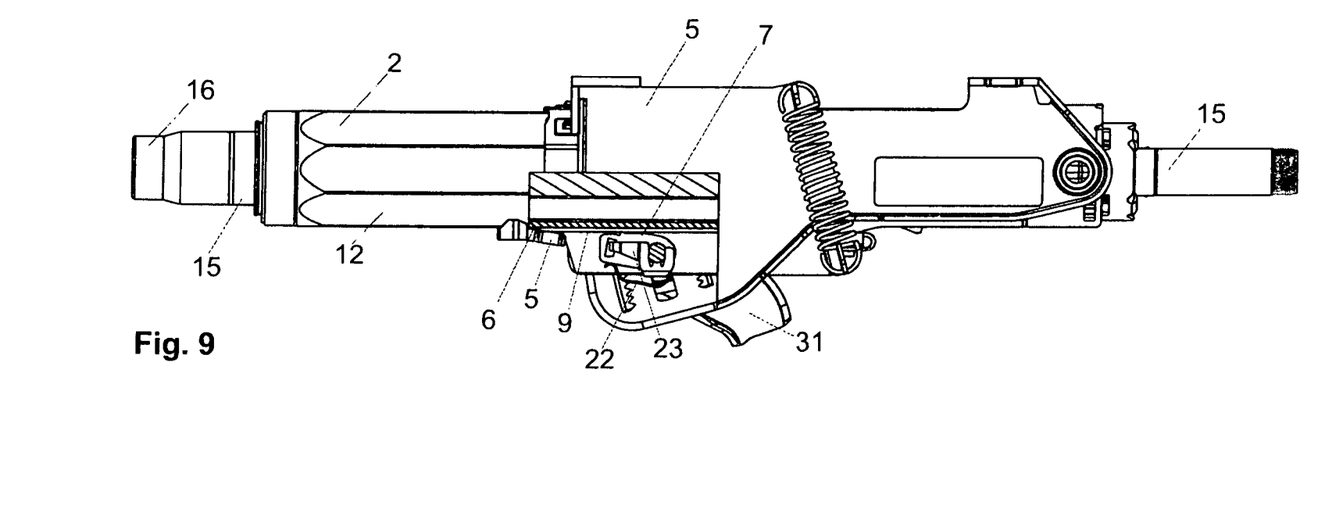
FIG. 9 is a side view of FIG. 4.

FIGS. 8 and 9 also show the first embodiment, each in a partially sectioned side view. FIG. 8 shows the normal operation analogously to FIG. 2. FIG. 9 shows the case of a crash analogously to FIG. 4.

Figure 10:
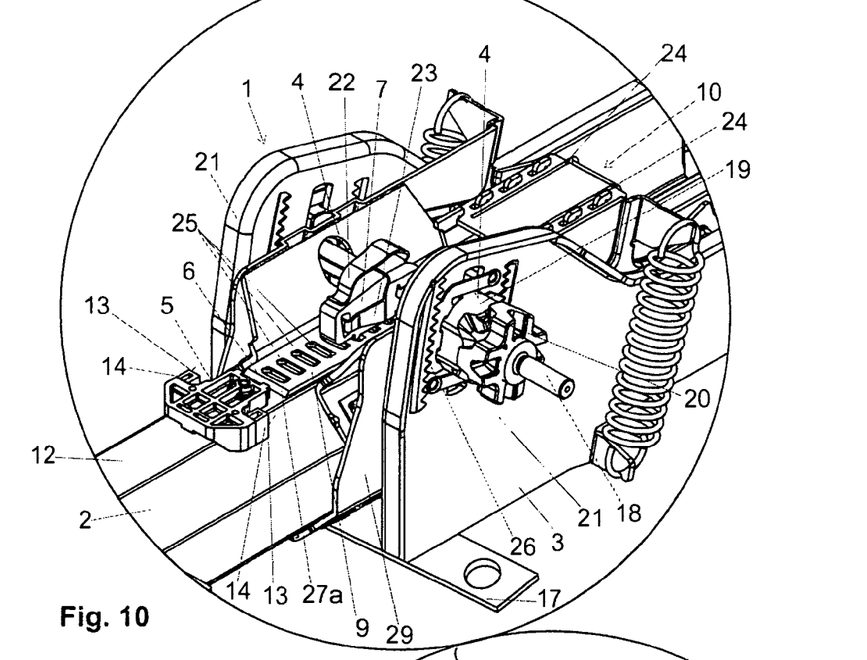
FIGS. 10 to 12 are depictions in conjunction with a second embodiment of a steering column according to the invention.
Figure 11:
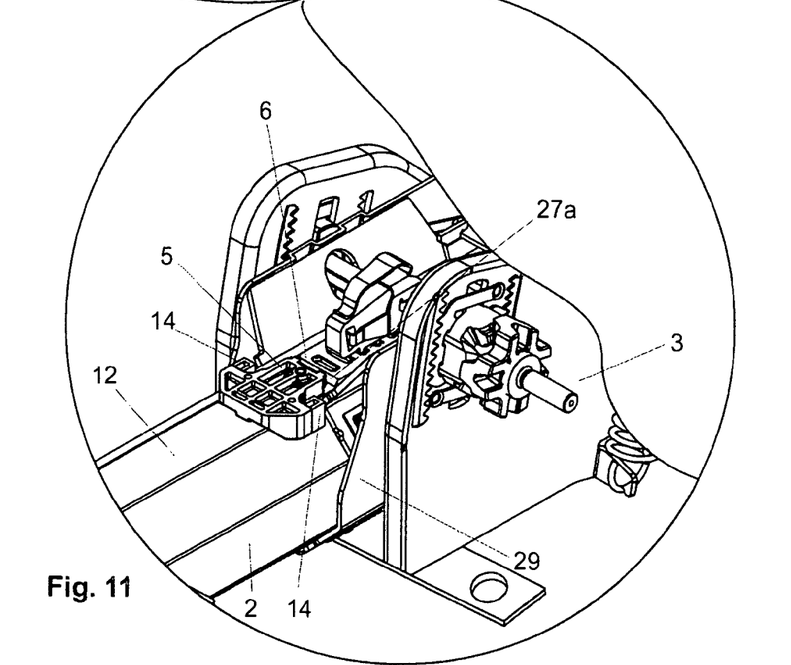
Figure 12:
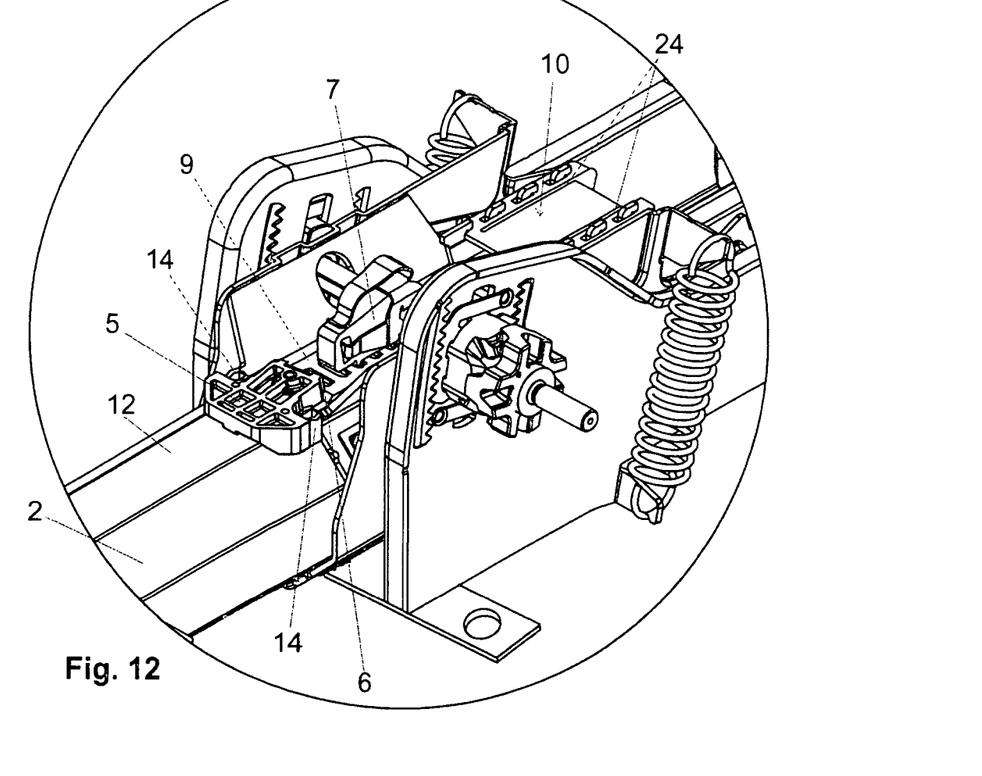

In FIGS. 10 to 12 a second embodiment of the invention is depicted, which is based on the first embodiment, however additionally is equipped with cushions 14 on the stop faces 13 of the stop element 5. Except for this difference, the essential basic structure as well as also the essential basic function of the second embodiment correspond to that of the first embodiment such that they do not need to be discussed again here. In the variant depicted in FIGS. 10 to 12, even in the case that the steering column 1 or its structural part 2 is completely driven to the end of the displacement path, a force peak for opening the further displacement path is at least reduced. For this purpose, the cushions 14 are provided which resist the normal actuation forces of the driver during the adjustment of the steering column 1 and preferably are implemented such that they are elastic or resilient. The cushions 14 can further also serve for the purpose, in the case of incorrect use with the opened securement device, of cushioning an excessively intense abutting of the stop element 5 on the further structural part 29 and therewith on the bracket unit or on the other structural part 3 without detaching the stop element 5 from the second structural part 2.

In terms of form and material selection, the cushions 14 can be implemented differently. They can be elastic hollow bodies as in the depicted embodiment. Other suitable elastic materials, however, can also be employed. Preferred implementations provide that the stop element 5 as well as the cushions comprise synthetic material. In order for the cushions 14 to be made correspondingly softer than the remaining stop element 5, a softer synthetic material, for example, can be utilized. Such parts can be readily produced using known injection molding methods; in particular, multi-component injection molding. In the depicted embodiment, the cushions are each provided with a correspondingly thin wall thickness such that they can yield elastically.

If the driver displaces the structural part 2 of the steering column 1 so far that the cushions 14 on the stop element 5 abut the further structural part 29 or structural part 3 without exerting any excessive force for the displacement, the cushions 14 are maintained in their full resilient length. If, in the event of a crash, the effect of a higher force occurs, the cushions 14 are compressed and simultaneously the tool 6 is pushed in the direction of the steering wheel connection 16 such that the stop element 5, as shown in FIG. 12, is correspondingly pried out or sheared off as described earlier in conjunction with the first embodiment. If the cushions 14 are configured to be resilient, the cushions 14 will move resiliently back into their starting size even if the driver applies an increased force for adjustment and reduces the force applied onto the structural part 2 before the closing of the securement device 4. Should in the exceptional case the cushions 14 be pushed with full force by the driver against the structural part 29 or 3 and the securement device 4 be locked in this position, the detachment force required in the event of a crash would increase correspondingly for detaching the stop element 5 and therewith for enabling further dislocation with the employment of the energy absorption device 10. Through the correspondingly precise layout of the tool 6, however, even in this case the force peak necessary for detaching the stop element 5 can be reduced to an acceptable measure. In FIG. 11 in a small detail of the steering column, the situation is illustrated in which the steering column is retracted in the longitudinal direction up to the end of the displacement path, and the stop face 13 of stop element 5, in the position in which the cushion 14 is resiliently sprung back, has been brought into contact with the end of the further structural part 29.

Figure 13:
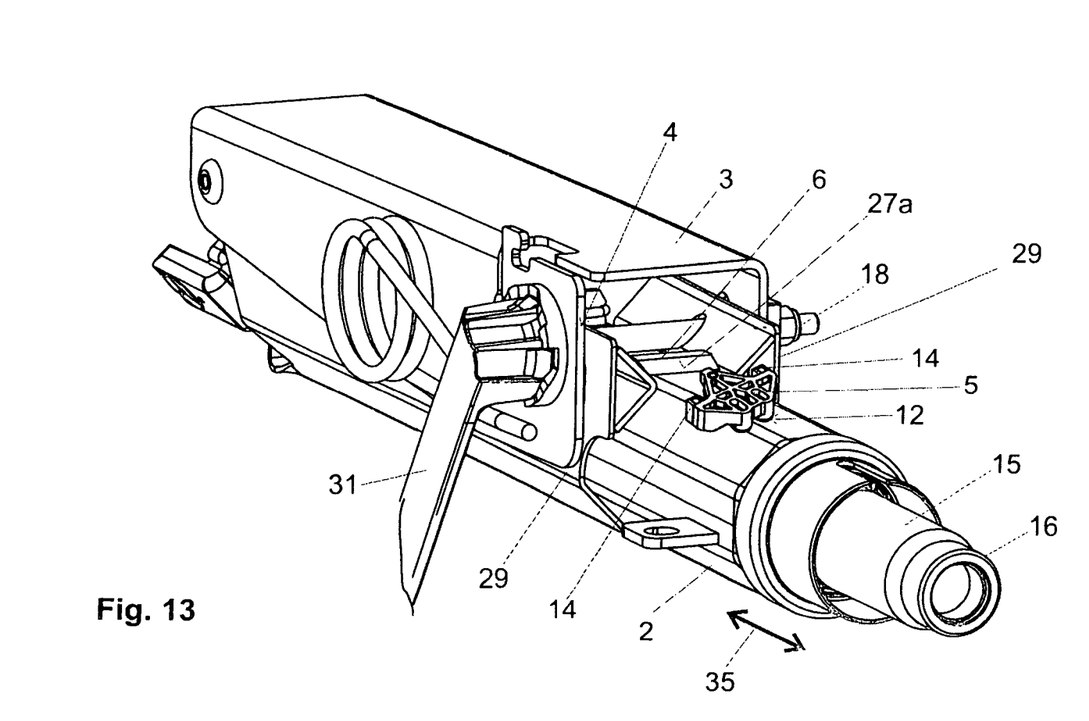
FIG. 13 shows a third embodiment of a steering column according to the invention.

FIG. 13 shows a third embodiment according to the invention, in which the structural part 2, thus the steering spindle bearing unit supporting the steering spindle 15 relative to the chassis-stationary bracket unit in the form of the structural part 3, is only length-adjustable in the direction 35. The securement device 4 is implemented as is known in the prior art, and is displaced by manually swiveling lever 31 between the closed and the opened position. In the opened position of the securement device 4 the structural parts 2 and 3 are displaceable relative to one another in order to be able to set the steering wheel (not shown here) and to be secured on the steering wheel connection 16, according to the wishes of the driver. In contrast to the previously described embodiments, in the embodiment according to FIG. 13 no flex tab 8 or tearing flex tab 9 is provided for energy absorption in the event of a crash. In the highly simple embodiment according to FIG. 13, the energy in the event of a crash with the securement device 4 closed is absorbed substantially through friction between the structural part 2 and the structural parts 3 and 29. The tool 6 in the depicted embodiment according to FIG. 13 is fixedly disposed on the further structural part 29 and therewith on the bracket unit in the form of the other structural part 3. The tool 6 here also has a wedge-shaped oblique face 27a, with which it is introduced or slid in the event of a crash between the stop element 5 and the structural part 2. In the event of a crash, the stop element 5 is detached from the structural part 2 without generation of a force peak in order to extend the displacement path for the energy absorption between the structural parts 2 and 3. The securement of the stop element 5 as well as its implementation with cushions 14 correspond substantially to the embodiment according to FIGS. 10 to 12. The securement on structural part 2 can also be implemented as shown in FIGS. 5 to 7. In the embodiment according to FIG. 13, the tool 6 is consequently secured or fixed permanently via the further structural part 29 on the other structural part 3 (i.e., the bracket unit).

Figure 14:
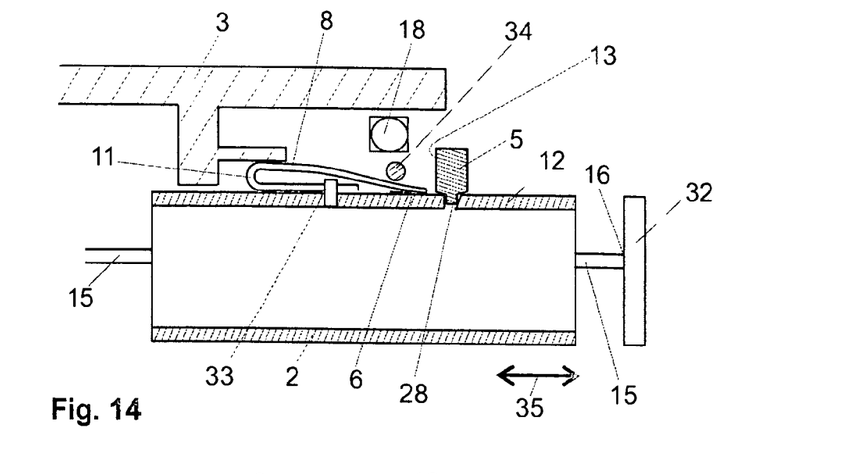
FIGS. 14 to 16 are highly schematic depictions of a fourth embodiment according to the invention.
Figure 15:
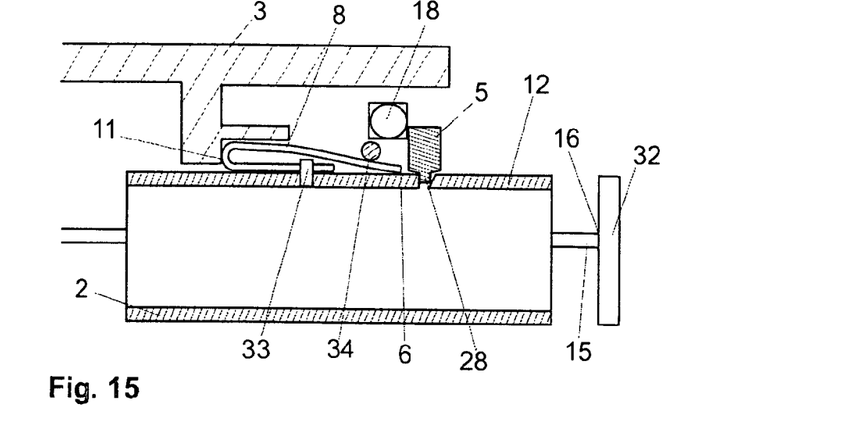
Figure 16:
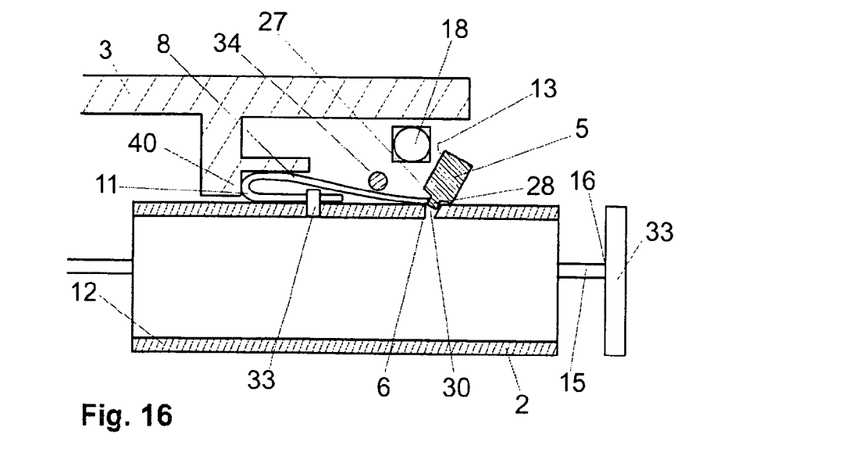

In FIGS. 14 to 16 a fourth embodiment according to the invention is depicted in outline. The structural part 3 is again a chassis-stationary bracket unit. The structural part 2 is displaceable relative thereto at least in the direction 35 (i.e., the longitudinal direction) if a securement device 4, not shown here completely, which can be implemented as in the other embodiments, is in the opened state. In the depictions according to FIGS. 14 to 16 of the securement device 4, only the clamp bolt 18 of this embodiment is shown in section. In the embodiment according to FIGS. 14 to 16, this clamp bolt 18 also has the function of serving as a counterstop for the stop face 13 of the stop element 5 if the displacement path of one of its ends has been reached. This stop situation is depicted in FIG. 15.

In the fourth embodiment, the tool 6 is also implemented as a portion of a tab. In the specifically shown case this is a flex tab 8. One end of the tab 8 is fixed on the second structural part 2 by means of a fixing fastener 33. The flex tab 8 comprises a deflection or recurvature 11. The tool 6 is located at another end of the tab 8 opposite the fixing fastener 33. A holding-down device 34 is secured on structural part 2 and ensures that the flex tab 8 is at least in the proximity of the tool 6 in contact on the outer surface 12 of structural part 2.

The fourth embodiment is a variant according to the invention in which the tool 6 is connected interactively preferably with a bent over region of a tab. The tool 6, at least during the detaching of the stop element 5 from the first of the structural parts 2, is supported (preferably secured) by means of the recurvature 11 on the other of the structural parts 3.

In the embodiment depicted in FIG. 16, the flex tab 8 is in contact with its recurvature 11 on a corresponding chassis-stationary stop 40 of structural part 3 in the event of a crash. During the sliding of the structural part 2 due to the crash, the flex tab 8 is reformed in the recurvature 11 and thereby is pushed with its end bearing the tool 6 in the direction of the steering wheel 33. It is, in turn, achieved thereby that the tool 6 is introduced or slid between the first structural part 2 or its outer surface 12 and the stop element 5 in order to pry out and/or shear off the peg 28 of the stop element 5 from the opening 30. Primarily to be noted in this embodiment is that through the staying of the recurvature 11 of the flex tab 8 on the structural part 3 or its stop 40 a transmission function results. Thus, the tool 6 is pushed twice as far in the direction of the steering wheel 33 as the structural part 2 is pushed during the sliding into the structural part 3 into the opposite direction. The stop element 5 is hereby detached by means of tool 6 from structural part 2 before the clamp bolt 18 does so.

For the sake of completeness reference is made to the fact that the corresponding recurvature 11 with the transmission function can also be attained through a traction cable or the like.

It is also in principle conceivable and feasible in the fourth embodiment to lower the force peak during the prying-out through corresponding cushion elements 14 as illustrated in the embodiment according to FIGS. 10 to 13. FIGS. 14 to 16 illustrate an alternative solution in which the tool 6 is moved counter to the displacement direction of structural part 2 relative to structural part 3 in the event of a crash and therewith pries out the stop element 5. In this manner it becomes possible to lower or avoid the force peak. In the depicted fourth embodiment the flex tab 8 or the tool 6 is preferably comprised of a thin spring steel band.

Figure 17:
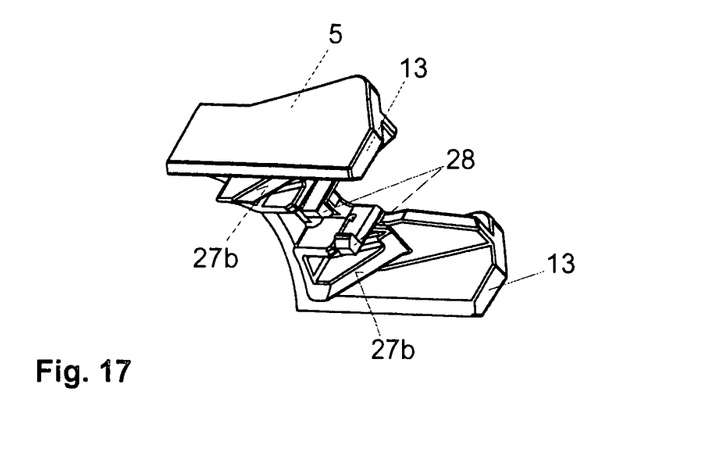
FIG. 17 is an embodiment of a stop element.

FIG. 17 illustrates a further embodiment of the stop element 5. The oblique faces 27b serve for prying out the stop element 5 in the event of a crash. The pegs 28 are here implemented as clips.

To the extent applicable or implementable all of the different individual features of the several examples can be interchanged and/or combined without leaving the scope of the invention.

The invention claimed is:

1. An adjustable steering column for a motor vehicle, the steering column comprising:
   at least two structural parts;
   at least one securement device; wherein the structural parts in an opened position of the securement device are displaceable in their position relative to one another along a displacement path and, in a closed position of the securement device, are fixedly secured in their position relative to one another;
   a stop element on at least a first one of the structural parts, the stop element being configured to delimit the displacement path, the stop element being detachable upon a force value being exceeded from the first one of the structural parts; and
   a tool for detaching the stop element, the tool being configured to slide underneath the stop element between the stop element and the first one of the structural parts.

2. The adjustable steering column as in claim 1, wherein the tool during the introduction between the stop element and the first one of the structural parts pries off and/or shears off the stop element from the first one of the structural parts.

3. The adjustable steering column as in claim 1, wherein the tool at least during the detaching of the stop element from the first one of the structural parts is supported on an other one of the structural parts.

4. The adjustable steering column as in claim 3, wherein the tool, relative to the other one of the structural parts, is permanently nonmovably supported on the other one of the structural parts or the tool, relative to the other one of the structural parts, is only in one engagement position of an engagement element nonmovably supported on the other one of the structural parts, and the engagement element also has a detached position in which the tool is movable relative to the other of the structural parts.

5. The adjustable steering column as in claim 1, wherein the tool is implemented as a portion of a tab.

6. The adjustable steering column as in claim 1, wherein the tool is a part of an energy absorption device of the adjustable steering column, and the energy absorption device, at least in the case of a motor vehicle crash, connects at least the two structural parts of the steering column with one another for the absorption of energy.

7. The adjustable steering column as in claim 1, wherein the tool is in interaction with a recurvature, and the tool at least during the detaching of the stop element from the first one of the structural parts is supported on another one of the structural parts by the recurvature.

8. The adjustable steering column as in claim 1, wherein the stop element is disposed so as to outwardly project on an outer surface of the first one of the structural parts, and the tool for the detaching of the stop element is introducible between the stop element and the outer surface of the first one of the structural parts.

9. The adjustable steering column as in claim 1, wherein the stop element comprises at least one stop face with which, upon reaching an end of the displacement path, the stop element abuts on another one of the structural parts or a further structural part connected with the other one of the structural parts.

10. The adjustable steering column as in claim 1, wherein at least one of the structural parts is a bracket unit for the chassis-stationary fixing on the motor vehicle, and a second one of the structural parts is a steering spindle bearing unit for the rotatable bearing of a steering spindle held by the bracket unit, wherein the steering spindle bearing unit, in the opened position of the securement device, is displaceable with respect to the bracket unit and, in the closed position of the securement device, is held fixedly in its position relative to the bracket unit.

11. The adjustable steering column as in claim 5, wherein the tab is a part of an energy absorption device of the adjustable steering column, and the energy absorption device, at least in the case of a motor vehicle crash, connects at least the two structural parts of the steering column with one another for the absorption of energy.

12. The adjustable steering column as in claim 9, wherein a cushion for cushioning the abutment is disposed on the stop face and/or the tool for detaching the stop element from the first one of the structural parts, and is introducible in a region outside of the stop face between the stop element and another of the structural parts.

13. The adjustable steering column as in claim 12, wherein the cushion is elastic.

14. The adjustable steering column as in claim 5, wherein the tab is selected from the group consisting of a flex tab, a tearing tab, and a tearing flex tab.

15. The adjustable steering column as in claim 7, wherein the recurvature is a bent-over region of a tab.

16. The adjustable steering column as in claim 1, wherein the stop element is disposed directly on the first one of the structural parts.

17. The adjustable steering column as in claim 16, wherein the tool is configured to slide in between the stop element and the first one of the structural parts.

18. The adjustable steering column as in claim 1, wherein the tool is configured to slide in between the stop element and the first one of the structural parts.

19. The adjustable steering column as in claim 1, wherein the tool is spaced apart from the stop element and is configured to contact the stop element upon the force value being exceeded.

20. The adjustable steering column as in claim 1, wherein a bottom surface of the tool is coplanar with a bottom surface of the stop element.

* * * * *